US011399368B2

(12) United States Patent
Blasco Serrano et al.

(10) Patent No.: US 11,399,368 B2
(45) Date of Patent: Jul. 26, 2022

(54) RESOURCE ALLOCATION FOR CARRIER AGGREGATION

(71) Applicant: Telefonaktiebolaget LM Ericsson (publ), Stockholm (SE)

(72) Inventors: Ricardo Blasco Serrano, Espoo (FI); Shehzad Ali Ashraf, Aachen (DE); Marco Belleschi, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 141 days.

(21) Appl. No.: 16/767,495

(22) PCT Filed: Nov. 27, 2018

(86) PCT No.: PCT/EP2018/082738
§ 371 (c)(1),
(2) Date: May 27, 2020

(87) PCT Pub. No.: WO2019/102041
PCT Pub. Date: May 31, 2019

(65) Prior Publication Data
US 2020/0413397 A1     Dec. 31, 2020

Related U.S. Application Data

(60) Provisional application No. 62/590,879, filed on Nov. 27, 2017.

(51) Int. Cl.
*H04W 72/04* (2009.01)
*H04L 1/18* (2006.01)

(52) U.S. Cl.
CPC ....... *H04W 72/0446* (2013.01); *H04L 1/1812* (2013.01); *H04W 72/0406* (2013.01)

(58) Field of Classification Search
CPC . H04W 72/0446; H04W 84/12; H04W 84/18; H04W 28/04; H04W 28/06; H04W 72/0406; H04L 1/1812
(Continued)

(56) References Cited

U.S. PATENT DOCUMENTS 10,772,075 B2 *   9/2020   Lee ........................ H04W 4/40
2015/0215082 A1 * 7/2015   Agiwal ............ H04W 72/0446
                                                           370/336
(Continued)

FOREIGN PATENT DOCUMENTS

WO    WO 2017/030338 A1 *   2/2017   ............ H04W 72/14
WO    WO 2017/197122 A1 *  11/2017   ............ H04W 76/02

OTHER PUBLICATIONS

3GPP TSG-RAN WG2 #93, Malta, Feb. 15-19, 2016, Tdoc R2-161566, Agenda Item: 7.1.1, Source: Ericsson, Title: Sidelink Resource Allocation in V2X. (Year: 2016).*
(Continued)

*Primary Examiner* — Pankaj Kumar
*Assistant Examiner* — Sanjay K Dewan
(74) *Attorney, Agent, or Firm* — Sage Patent Group

(57) ABSTRACT

A method in a radio device of radio resource allocation for transmitting data on a plurality of communication carriers is provided. The method includes sensing on a first carrier and obtaining a first set of candidate radio resources for a first transmission on the first carrier, performing a first selection of one or a plurality of the candidate radio resources from the first set to be used for the first transmission, sensing on a second carrier and obtaining a second set of candidate radio resources for a second transmission on the second carrier, performing a second selection of one or a plurality of the candidate radio resources from the second set to be used for the second transmission, and performing the first
(Continued)

Figure 1:
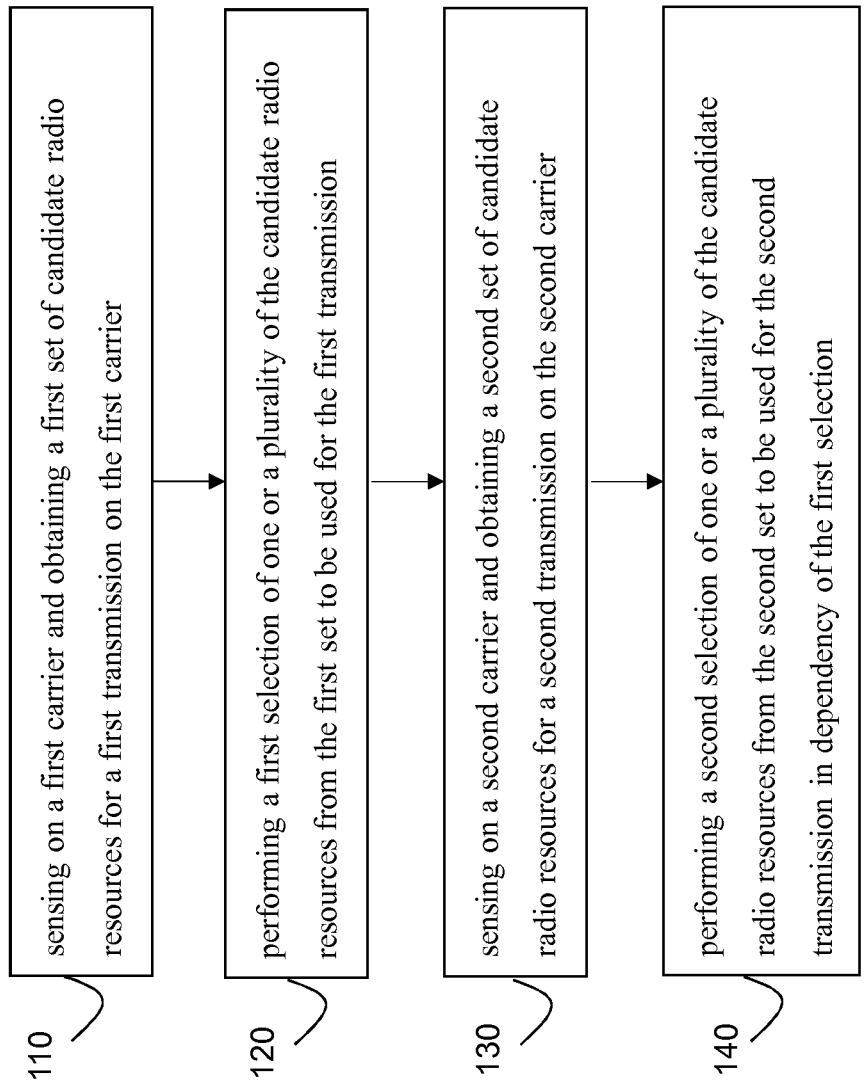

selection and the second selection in dependency to each other.

33 Claims, 8 Drawing Sheets

(58) Field of Classification Search
USPC .......................................................... 370/336
See application file for complete search history.

(56) References Cited

U.S. PATENT DOCUMENTS

| | | | |
|---|---|---|---|
| 2015/0333898 A1* | 11/2015 | Ji .............................. | H04L 5/22 370/280 |
| 2016/0226650 A1* | 8/2016 | Chen ..................... | H04L 5/1469 |
| 2017/0030338 A1 | 2/2017 | Kramer et al. | |
| 2017/0034751 A1* | 2/2017 | Fujishiro ......... | H04W 36/00837 |
| 2017/0238321 A1* | 8/2017 | Sartori .................... | H04W 4/80 455/452.1 |
| 2017/0295579 A1* | 10/2017 | Sheng .................. | H04W 64/00 |
| 2017/0325262 A1* | 11/2017 | Tomeba ................ | H04W 84/12 |
| 2018/0020428 A1* | 1/2018 | Madhavan .......... | H04W 72/042 |
| 2018/0027582 A1* | 1/2018 | Yerramalli .......... | H04W 74/006 370/336 |
| 2018/0035342 A1* | 2/2018 | Fujishiro ......... | H04W 36/00837 |
| 2018/0249444 A1* | 8/2018 | Sorrentino ............ | H04W 72/06 |
| 2019/0075548 A1* | 3/2019 | Lee ..................... | H04W 72/044 |
| 2019/0082421 A1* | 3/2019 | Sartori .................. | H04W 48/16 |
| 2019/0090250 A1* | 3/2019 | Lee ....................... | H04W 72/02 |
| 2019/0116565 A1* | 4/2019 | Chae .................... | H04W 24/10 |
| 2019/0124592 A1* | 4/2019 | Pu ........................ | H04W 52/028 |
| 2019/0182840 A1* | 6/2019 | Feng ................. | H04W 74/0816 |
| 2019/0182850 A1* | 6/2019 | Wang ................. | H04W 72/1215 |
| 2019/0230643 A1* | 7/2019 | Chae ..................... | H04W 72/02 |
| 2019/0305915 A1* | 10/2019 | Zhu ........................ | H04L 5/0083 |
| 2020/0037358 A1* | 1/2020 | Chae ................. | H04W 74/0808 |
| 2020/0221271 A1* | 7/2020 | Kim ...................... | H04W 72/12 |
| 2021/0120589 A1* | 4/2021 | Tu ..................... | H04W 74/0816 |
| 2021/0144726 A1* | 5/2021 | Hui ....................... | H04L 5/0048 |
| 2021/0212025 A1* | 7/2021 | Selvanesan ........... | H04W 76/14 |
| 2021/0314966 A1* | 10/2021 | Hui .................... | H04W 72/0406 |
| 2021/0337519 A1* | 10/2021 | Farag .................... | H04W 72/04 |

OTHER PUBLICATIONS

International Search Report and Written Opinion of the International Searching Authority, PCT/EP2018/082738, dated Feb. 13, 2019, 9 pages.

"LTE; Evolved Universal Terrestrial Radio Access (E-UTRA); Medium Access Control (MAC) Protocol Specification," 3GPP TS 36.321 Version 14.4.0, Release 14 (ETSI TS 136 321 V14.4.0) (Oct. 2017) 110 pages.

"LTE; Evolved Universal Terrestrial Radio Access (E-UTRA); Physical layer procedures," (3GPP TS 36.213 version 14.4.0 Release 14) (ETSI TS 136 213 V14.4.0) (Oct. 2017) 464 pages.

"Sidelink Resource Allocation in V2X," (Tdoc R2-161566) 3GPP TSG-RAN WG2 #93, Malta, Feb. 15-19, 2016, (XP051055404) 10 pages.

Examination Report, Indian Patent Application No. 202047026661, dated Jul. 27, 2021, 6 pages.

* cited by examiner

RESOURCE ALLOCATION FOR CARRIER AGGREGATION

CROSS REFERENCE TO RELATED APPLICATIONS

This application is a 35 U.S.C. § 371 national stage application of PCT International Application No. PCT/EP2018/082738 filed on Nov. 27, 2018, which in turns claims domestic priority to U.S. Provisional Patent Application No. 62/590,879, filed on Nov. 27, 2017, the disclosures and content of which are incorporated by reference herein in their entirety.

TECHNICAL FIELD

The invention relates to resource selection for carrier aggregation and especially to resource selection for sidelink communication within the frame of vehicle-to-everything, V2X, communication.

BACKGROUND

In 3GPP Release 14 LTE specifications, support for (LTE) V2X communication has been introduced. V2X is a collective term which includes any combination of direct communication between vehicles, pedestrians and infrastructure. V2X communication may take advantage of a network, NW, infrastructure, when available, but at least basic V2X connectivity should be possible even in case of lack of coverage. Providing an LTE-based V2X interface may be economically advantageous because of the LTE economies of scale and it may enable tighter integration between communications with the NW infrastructure (V2I) and V2P and V2V communications, as compared to using a dedicated V2X technology.

V2X communications may carry both non-safety and safety information, where each of the applications and services may be associated with specific requirements sets, e.g., in terms of latency, reliability, and/or capacity.

Within the frame of vehicular communication, the European Telecommunications Standards Institute, ETSI, has defined two types of messages for road safety: Co-operative Awareness Message (CAM) and Decentralized Environmental Notification Message (DENM):

The CAM messages are intended to enable vehicles, including emergency vehicles, to notify their presence and other relevant parameters in a broadcast fashion. Such messages may target other vehicles, pedestrians, and infrastructure, and are handled by their applications. CAM message may also serve as active assistance to safety driving for normal traffic. The availability of a CAM message may be regularly checked, e.g. indicatively checked for every 100 ms, yielding a maximum detection latency requirement of <=100 ms for most messages. The latency requirement for Pre-crash sensing warning may be much shorter, e.g. 50 ms.

The DENM messages are event-triggered, e.g. triggered when braking. The availability of a DENM message may also be regularly checked, e.g. also checked for every 100 ms, and the requirement of maximum latency is <=100 ms.

The package size of CAM and DENM message may vary e.g. from 100+ to 800+ bytes; a typical size may be around 300 bytes. The message is supposed to be detected by all vehicles in proximity.

The Society of the Automotive Engineers, SAE, also defined a Basic Safety Message, BSM, for Distributed Short Range Communications, DSRC, with various messages sizes defined. According to the importance and urgency of the messages, the BSMs may be further classified into different priorities.

In Release 14, two modes of operation, also being referred to as transmission modes or resource allocation modes), have been introduced for V2X terminals or UEs: Mode 3 and Mode 4.

Mode 3 refers to a scheduling (and interference) management of V2V traffic assisted by central communication node, e.g. a base station, eNB or gNB that assigns the resources being used for V2V signaling and sends corresponding control signals to the (V2X) UEs.

Mode 4, also being known as autonomous mode, refers to scheduling (and interference) management of V2V traffic based on distributed algorithms implemented in the (V2X) UEs. The UEs thus take decisions related to transmission on its own. On important aspect of Mode 4 is that the UE selects the time-frequency resources to use for transmission from a large set of resources configured by the network or preconfigured in the UE. In other words, the UE performs autonomous resource allocation, also being referred to as distributed resource allocation.

In Mode 4, autonomous resource allocation makes combined use of two features: semi-persistent transmission and sensing-based resource allocation. Semi-persistent transmission exploits the fact that typical safety V2X traffic is (approximately) periodic, e.g. new packets are generated at regular intervals. Since packet arrivals are periodic, a transmitting UE can notify other UEs about its intention to use certain time-frequency resources for future transmissions. Whereas, sensing consists of monitoring the radio channel to learn the presence of such semi-persistent transmissions. In this way, UEs can avoid collisions when selecting their resources for their own transmissions. This is also referred to as sensing-based resource allocation.

In the following embodiments, mainly Mode 4 is being referred to. However, similar procedure/method of scheduling may be adopted for Mode 3 or any other comparable modes. 3GPP TS 36.213 specifies sensing-based resource allocation in the LTE. This allocation may be split in different parts:

A first part refers to sensing channel resources. The procedure as described in TS 36.213 defines how the UE is expected to sense the channel during a certain period of time (1 second) and used received signals to predict the future utilization of the radio resources. Based on this predicted utilization, the UE creates a list of radio resources (i.e., time-frequency resources) that may be selected for transmission. This list is usually a subset of all the radio resources; that is, some resources are excluded as candidates for selection (e.g., because the UE predicts that they will be used by another UE).

A second part refers to resource allocation. The procedure as described TS 36.321 defines how the UE selects the resources it needs for transmission from the list of candidate resources provided by sensing.

Currently, enhancements to the LTE V2X functionalities introduced in Release 14 are discussed to be part of the upcoming Release 15 LTE specification. One enhancement refers to carrier aggregation, CA, which consists of performing simultaneous transmissions over multiple carriers. By using CA, it is possible to transmit larger packets, achieve larger transmission rates (in bits per second), or increase the reliability of the system (e.g., by transmitting the same packet over multiple carriers). The transmissions over multiple carriers may take place at the same time or at different times (usually separated by a few milliseconds).

The autonomous resource allocation introduced in Release 14 for LTE V2X is being designed for single carrier operation. It may be possible to extend this algorithm to multiple carriers e.g. by performing independent per carrier resource allocation. However, such an extension may cause several problems:

- UEs are subject to half-duplex constraints. That is, typically a UE cannot transmit and receive at the same time in the same band or even in bands that are not sufficiently far apart from each other (in frequency). Consequently, a UE transmitting on multiple carriers at different time instances may miss transmissions by other UEs more often than a UE transmitting on a single carrier.
- UEs have limited hardware capabilities. That is, even if a UE can transmit on multiple carriers, it may only use the carriers sequentially. It may also take some time (TX switching time) for the UE to switch from one carrier to another carrier.
- UEs have power restrictions. That is, even if a UE would be able to transmit on multiple carriers at the same time, it may not be desirable to do so because the resulting power on each carrier may be too low. Such restrictions may be due to regulations and/or due to limitations of the UE (e.g., hardware or architecture).

Alternatively, it could be envisaged to introduce a new autonomous resource allocation algorithm for operation on multiple carriers. However, introducing such new resource allocation algorithm only to be used by a subset of UEs (i.e., those UEs using carrier aggregation) may cause compatibility problems with the remaining UEs that use the existing procedure. For reasons of efficiency, it may be undesirable to segregate the UEs depending on their resource allocation algorithm. Further, different resource allocation algorithms for different UEs may be disadvantageous for many UEs, e.g. in terms of probability of collisions, and/or resource availability.

SUMMARY OF THE INVENTION

Embodiments of the invention describe allocate resources to radio devices, e.g. UEs performing multi-carrier transmission (e.g., carrier aggregation) to mitigate at least some of the problems described above.

In an embodiment, resource allocation/selection is performed to reduce a performance loss that may be caused by multi-carrier transmission limitations. Thereto, resource allocation on one carrier is being performed depending on one or a plurality of other radio resources selected on one or a plurality of other carriers.

An embodiment refers to a method in a radio device radio resource allocation for transmitting data on a plurality of communication carriers, comprising, sensing on a first carrier and obtaining a first set of candidate radio resources for a first transmission on the first carrier, performing a first selection of one or a plurality of the candidate radio resources from the first set to be used for the first transmission, sensing on a second carrier and obtaining a second set of candidate radio resources for a second transmission on the second carrier, performing a second selection of one or a plurality of the candidate radio resources from the second set to be used for the second transmission, wherein the first selection and the second selection are performed in dependency to each other.

According to an embodiment, the radio device selects resources for a first carrier and then applies a restriction to the resources that may be selected in the second carrier.

Another embodiment refers to radio device adapted to perform the steps of sensing on a first carrier and obtaining a first set of candidate radio resources for a first transmission on the first carrier, performing a first selection of one or a plurality of the candidate radio resources from the first set to be used for the first transmission, sensing on a second carrier and obtaining a second set of candidate radio resources for a second transmission on the second carrier, performing a second selection of one or a plurality of the candidate radio resources from the second set to be used for the second transmission, wherein the first selection and the second selection are performed in dependency to each other.

In another embodiment, the radio device is a user equipment according to 3GPP specifications.

In another embodiment, the radio device is an access node or base station (eNB or gNB) according to 3GPP specifications.

Another embodiment refers to a communication system including a host computer comprising processing circuitry configured to provide user data; and a communication interface configured to forward the user data to a cellular network for transmission to a user equipment, UE, wherein the cellular network comprises a base station having a radio interface and processing circuitry, the base station and/or the UE being adapted to perform the steps of sensing on a first carrier and obtaining a first set of candidate radio resources for a first transmission on the first carrier, performing a first selection of one or a plurality of the candidate radio resources from the first set to be used for the first transmission, sensing on a second carrier and obtaining a second set of candidate radio resources for a second transmission on the second carrier, performing a second selection of one or a plurality of the candidate radio resources from the second set to be used for the second transmission, wherein the first selection and the second selection are performed in dependency to each other.

BRIEF DESCRIPTION OF THE DESCRIPTION OF THE DRAWINGS

Figure 2:
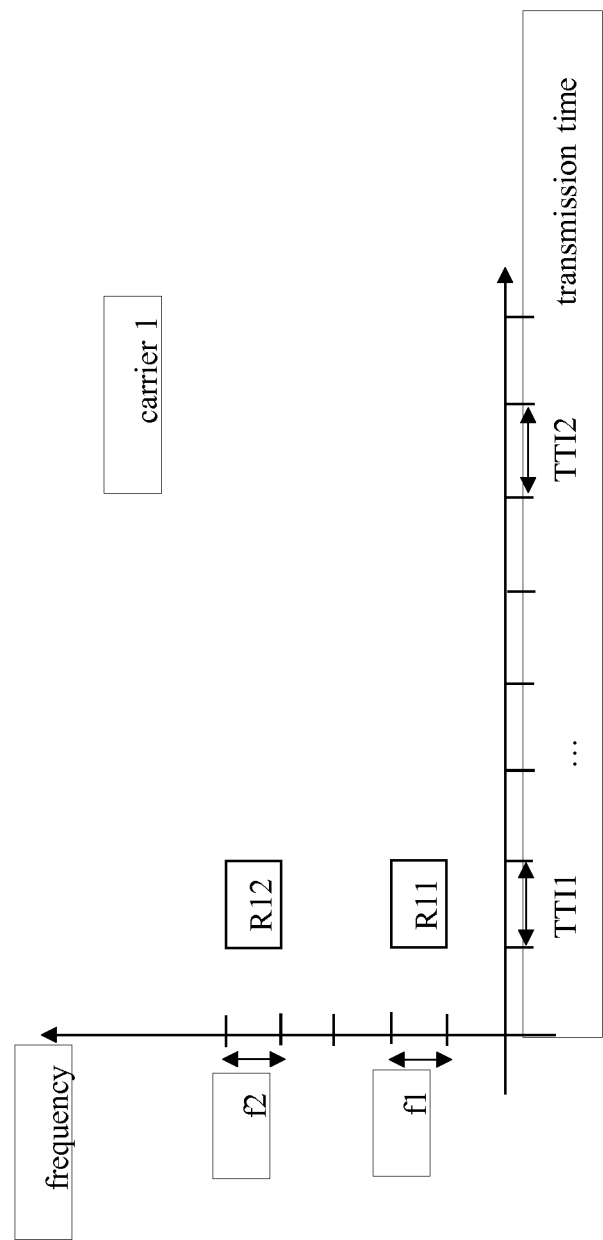
Figure 3:
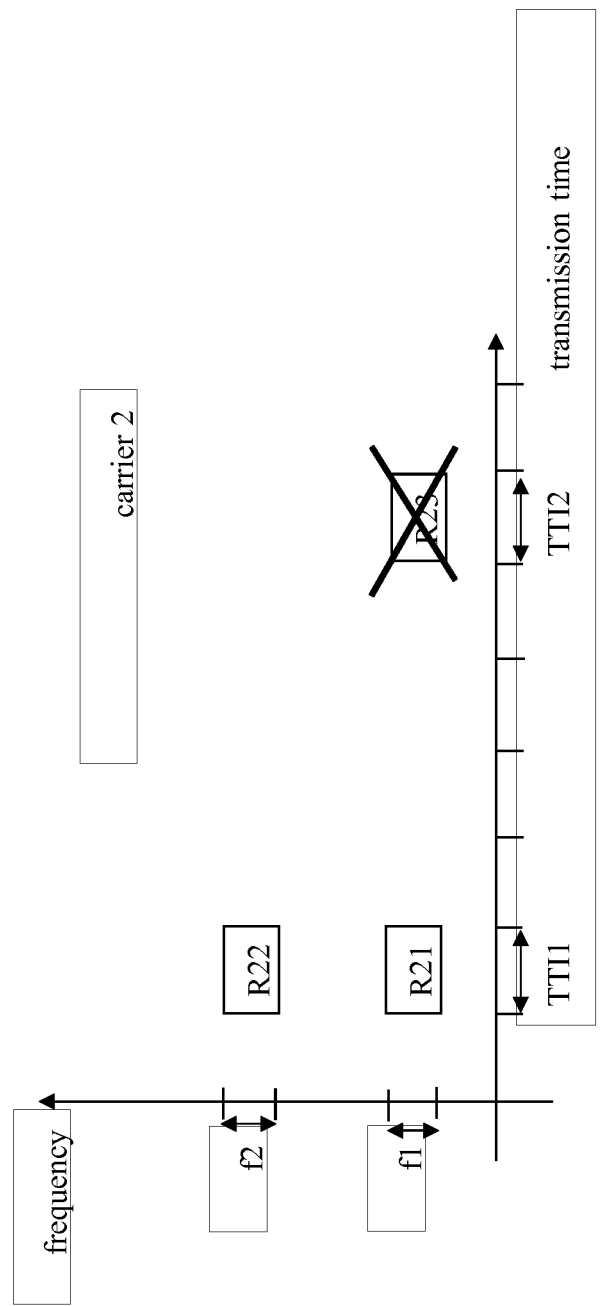
Figure 4:
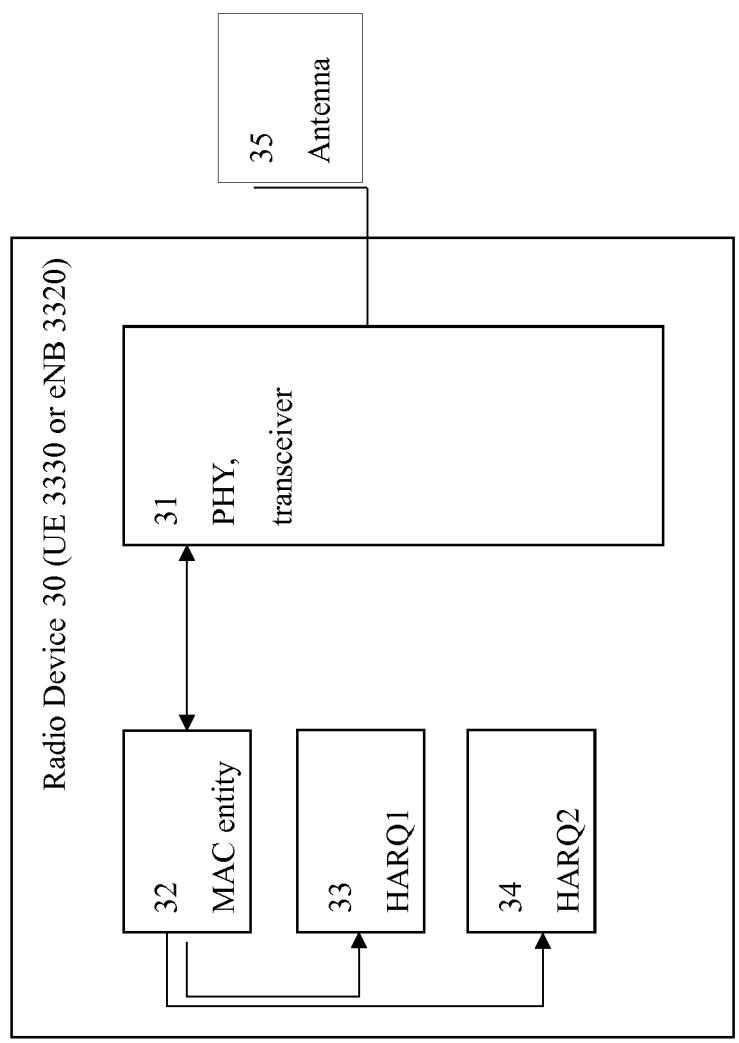
Figure 5:
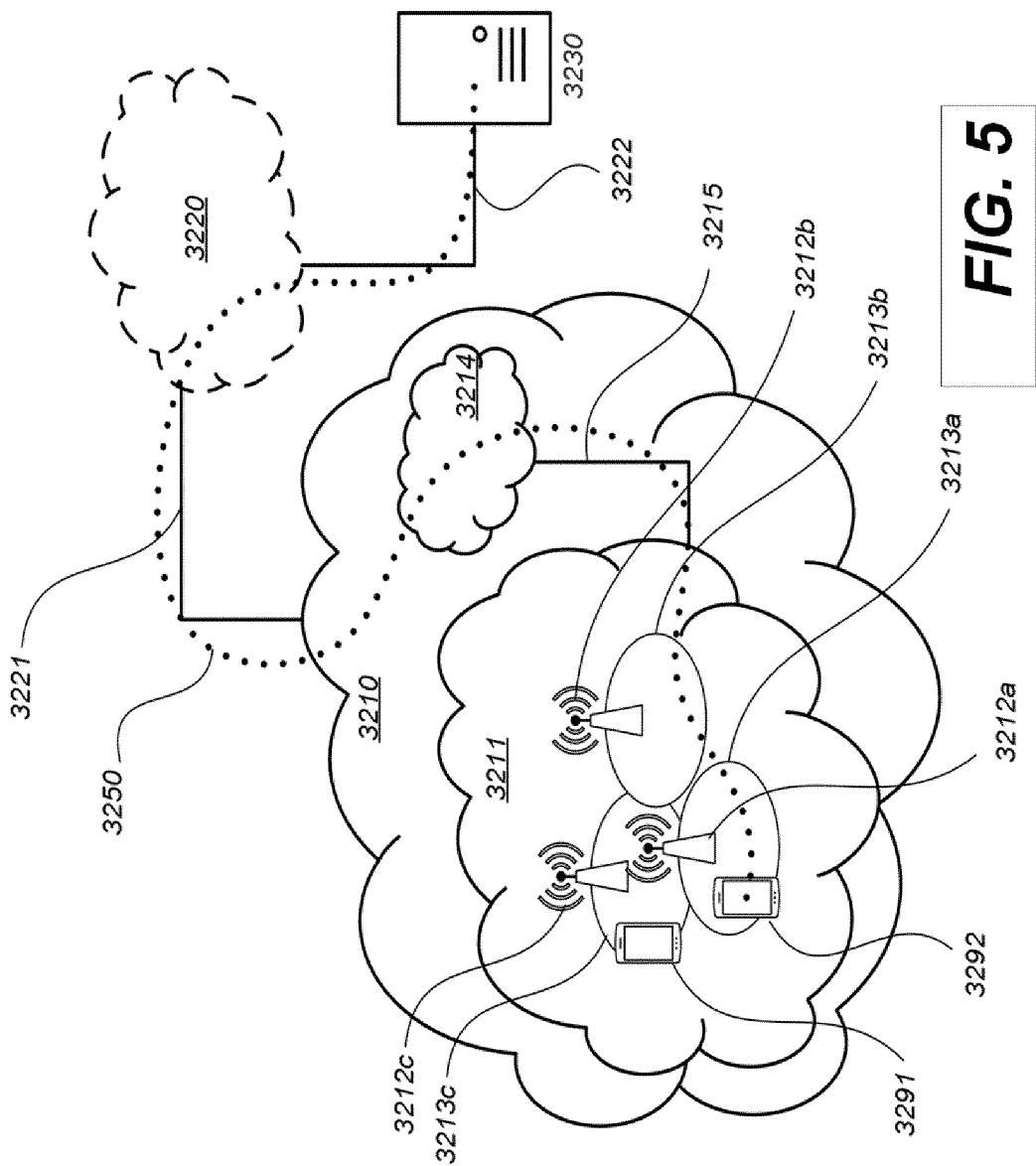
Figure 6:
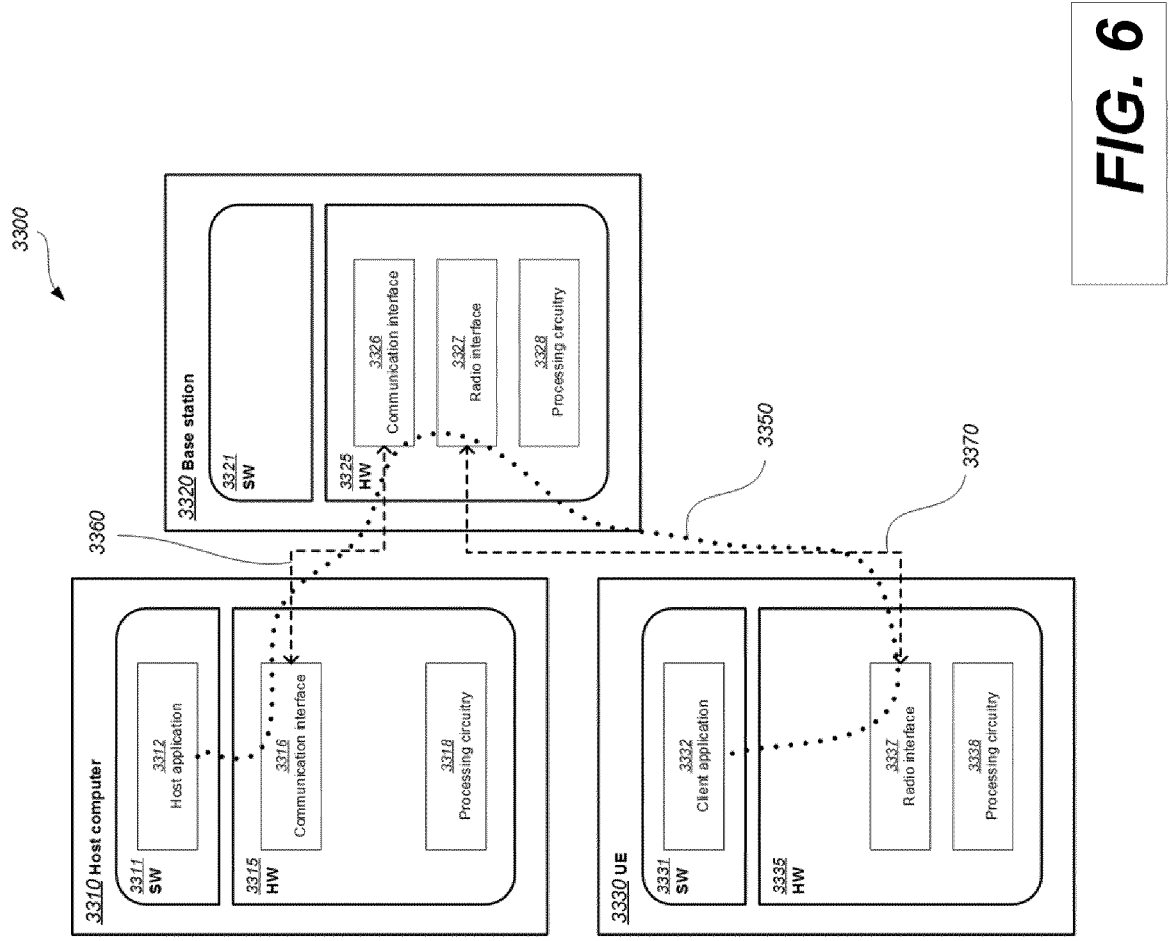

FIG. 1 schematically illustrates a method according to embodiments,

FIGS. 2 and 3 schematically illustrate an exemplary resource selection involving radio transmission resources in different carriers, FIG. 4 schematically illustrates a radio device for implementing a method according to FIG. 1, FIG. 5 schematically illustrates a telecommunication network connected via an intermediate network to a host computer, FIG. 6 is a generalized block diagram of a host computer communicating via a base station with a user equipment over a partially wireless connection, and FIGS. 7 to 10 are flowcharts illustrating methods implemented in a communication system including a host computer, a base station and a user equipment.

DETAILED DESCRIPTION

In the following, further embodiments of allocating resources for transmission on multiple carriers are described by way of example. The embodiments or parts of embodiments may be combined.

The embodiments may relate to LTE, NR, as well as to other radio access technologies. They may relate to any type of communication in which a node allocates resources for transmission on multiple carriers. This may include sidelink communications (device to device communication, e.g., D2D, V2X, etc.) as well as cellular communication (involving radio access nodes or base stations like eNB or gNB. Specifically, the embodiments may refer to an autonomous resource allocation procedure in a UE (without involving radio access nodes. The procedures described in the embodiment may as well be implemented in radio access network node (e.g., eNB or gNB). However, similar methods may be implemented in any radio infrastructure node.

A first embodiment refers to a method in a radio device, e.g. a UE or radio access node of radio resource allocation for transmitting data on a plurality of communication carriers, e.g. carrier 1 and carrier 2. FIG. 1 thereto shows the following steps:

Step 110: sensing on a first carrier (e.g. carrier 1) and obtaining a first set of candidate radio resources for a first transmission on the first carrier, Step 120: performing a first selection of one or a plurality of the candidate radio resources from the first set to be used for the first transmission, Step 130: sensing on a second carrier (e.g. carrier 2) and obtaining a second set of candidate radio resources for a second transmission on the second carrier, and Step 140: performing a second selection of one or a plurality of the candidate radio resources from the second set to be used for the second transmission.

The first selection and the second selection are performed in dependency to each other; e.g. the second selection is performed in dependency of the first selection.

In an embodiment, the radio resources are characterized according or are defined by one or a plurality of resource properties, e.g. frequency (sub-band) and transmission time (e.g. a certain TTI within a certain timeframe of a plurality of TTIs). The second selection is based on an evaluation of resource properties: of the one or the plurality of the candidate radio resources selected from the first set, and of the radio resources of the second set.

In an embodiment, the first set of candidate radio resources is performed by selecting a certain number of radio resources among the candidate radio resources obtained by the sensing on the first carrier, e.g. by randomly selecting the certain number.

In an embodiment, the first selection is performed in dependency of the second set of candidate radio resources obtained by the sensing on the second carrier. Therein, a first subset of candidate resources may be obtained by removing one or a plurality of candidate radio resources from the first set in dependency of the second subset; performing the first selection may be performed by selecting the one or the plurality of the candidate radio resources from the first subset.

In an embodiment, performing the second selection comprises selecting a radio resource associated to the same transmission time or TTI (transmission time interval) as the transmission time or TTI associated to at least one of the resources selected to be used for the first transmission.

FIG. 2 shows a schematic resource grid of a first carrier, carrier 1, with a time axis as abscissa and a frequency axis as ordinate. The time axis is divided into a plurality of subsequent transmission time intervals, TTIs, e.g. each time 10 TTIs per radio frame (TTI0–, TTI1, . . . , TTI9). axis is divided into a plurality of frequency intervals. Exemplary frequency intervals are depicted as first interval f1 and second interval f2 (f1 and f2 may also be regarded as carrier frequencies associated to those intervals).

By way of example, a first plurality (or set) of radio resources comprises first resources R11 and second resources R12 each for transmission at the first time TTI1, wherein the first resources (or resource block) R11 are associated to the first frequency interval f1, and the second resources R12 are associated to the second frequency interval f2.

FIG. 3 shows a similar schematic resource grid of a second carrier, carrier 2. By way of example, FIG. 3 shows a list of candidate resources for the second carrier comprising two resources R21 and R22 for transmission at the first TTI 1 and third resources R23 for transmission at the second TTI2. Ressources R21 and R23 are by way of example associated to the first frequency interval F1 and third resources R23 are associated to the second frequency interval f2.

The list of selected resources for the first carrier (performed in step 120) carrier by way of example only contains resources (R11, R12, R13) for transmission at the first TTI1. In the example shown here, the resources (R23) at the second TTI2 are removed or excluded from the second set. In this way it is taken care that all the resources of both carriers are for transmission at the same TTI (TTI1 in this example). Such, the aforementioned half-duplex constrains may be met.

In another embodiment, performing the second selection comprises selecting out of the second set one or a plurality radio resources for transmission time(s) or TTI(s) that are different to the transmission time or TTI (or to all of the transmission times) of the radio resource(s) selected to be used for the first transmission. Thereto, if the radio resources selected from the first set are resources for a first transmission time (e.g. TTI1) and the list of candidate resources in the second set comprises radio resources for transmission at the first the time (e.g. TTI1) and at a second time (TTI2), the second selection comprises selecting among the radio resources for the second transmission time (TTI2) or discarding the radio resources at the first transmission time (TT1). According to the example of FIG. 2 and, that would mean discarding resources R21 and R22 and keeping resource R23.

In an embodiment, a ranking of the first set and or the second set may be performed. E.g. the set of candidate radio resources for the second transmission may be raked into a plurality of priority levels based on a comparison of the transmission times (TTIs) of the candidate resources selected from the first set for the first transmission, and the transmission times (TTIs) of the candidate resources of the candidate resources of the second list. Therein, the ranking may be performed such that radio resources for transmission at the same time (or TTI) as the transmission time (or TTI) of any of the resources selected from the first set for the first transmission are ranked higher (priority p2) than the other resources of the second set (priority p1). Therein, the ranking may be performed such that radio resources for transmission at the same time (or TTI) as the transmission time of any of the resources selected from the first set for the first transmission are ranked lower level (priority p1) than the priority level (priority p2) of the other resources of the second set.

In an embodiment, performing the second selection of the one or the plurality of the candidate radio resources from the second set to be used for the second transmission is based on the priority levels of the radio resources, such that only radio resources of the priority level above the lower level are selected, or that only radio resources of the priority level above the lower level are selected, if the number of such radio resources is not smaller than a certain (defined) number).

In an embodiment, performing the first and/or the second selection may be based on a random selection of resources out of the respective candidate set.

FIG. 4 shows a block diagram of an exemplary radio (or wireless) device 30. The radio device may be a UE or an eNB. As shown in FIG. 4, the radio device 30 comprises physical layer functions or PHY entity 31 and Media Access Control, MAC, layer functions or MAC entity 32, wherein the steps of sensing on the first carrier and sensing on the second carrier are performed by the physical layer functions 31, and wherein the physical layer functions transmit an information indicative of the candidate radio resources of the first set and the second set to the MAC layer functions 32. The MAC layer functions may perform the first selection (step 120) and the second selection (step 140). Alternatively, all the selection of the sets of candidate resource may be performed by the physical layer 31.

The MAC layer may be commutatively coupled to a first (sidelink) Hybrid Automatic Repeat Request, HARQ, entity 33 associated to the first carrier and a second (sidelink) HARQ entity 34 associated to the second carrier.

The MAC entity 32 allocates resources to both carriers and associated HARQ entities on the base of the said passed candidate resources without any further action as compared to option described above.

The HARQ entities 33 and 34 may deliver their respective data to the physical layer entity 31 which may suppress some of the transmissions which the MAC entity 32 may have granted, In an embodiment, the physical layer entity 31 removes resources at the first time from the set of candidate resources to be passed to the MAC entity 31 (in this case, the MAC entity may only perform resource allocation of the resources available at first time signaled by the physical layer entity).

In an embodiment, the wireless device, e.g. the MAC layer or the PHY layer, may further consider other factors to determine whether to select resources at first time or second time. For example, even if for both first carrier and second carrier, there are candidate resources at second time and only for one of said carriers, e.g. the first carrier, there are candidate resources available at first time, the MAC entity may schedule transmission for the first HARQ entity 33 at first time and/or the second time, and transmissions for the second HARQ entity 34 at the second time. Thereto, at least one of the following conditions may be met:
1) the time gap between the TTI at first time (TTI1) and the TTI at second time (TTI1) is larger than a certain threshold,
2) delay sensitive data is present in the HARQ buffer, for which transmitting at the second time may not fulfill certain latency requirements,
3) an amount of data in the buffer is larger than the resources available by only transmitting at second time, e.g. it would result in more radio link control (RLC) service data unit (SDU) segments than transmitting on both first time and second time,
4) by transmitting on both carriers at first time, the available power budget in the wireless device is exceeded.

The physical layer 31 may be coupled, e.g. through a transceiver, to an antenna 35.

In the following embodiments are described in more detail. By mean of example, within these embodiments the radio device is a UE 30.

First Further Embodiment

In this embodiment resources for transmission are selected for a first carrier. Then, the resulting selection for the first carrier is used for selecting resources for a second carrier.

Thereto, the UE 30 may perform the following steps:
sensing individually on each of carriers and obtaining for each carrier, a list of candidate radio resources for transmission;
selecting resources for a first transmission in a first carrier from the set of candidate resources; and
restricting the list of candidate resources for the second carrier based on the resources selected for the first transmission in the first carrier and selecting resources for transmission in the second carrier from the restricted list.

For example, the sensing-based resource allocation procedure as described above is modified as follows to allow for simultaneous transmission on two carriers (extensions to more carriers are straightforward):
The UE 30 performs sensing individually on each of the carriers. For each carrier, the UE 30 obtains (independently) a list of candidate radio resources for transmission.
At least one of the lists of candidate resources may be modified by discarding some of the resources. For example, if the list of candidate resources for the first carrier contains resources for transmission at first time Ta and second time Tb and the list of candidate resources for the second carrier only contains resources for transmission at second time Tb, then the resources at first time Ta may be removed from the list of the first carrier.
Discarding some of the resources may be subject to certain conditions. For example, if not enough resources can be found after discarding (e.g., 20%), then the UE 30 may stop (may not be allowed) to continue executing the method.
The UE 30 selects resources for a first transmission in a first carrier from the set of candidate resources. For example, resources may be selected at random.
The UE 30 restricts the list of candidate resources for the second carrier based on the resources selected for the first transmission in the first carrier:
For example, if the UE 30 has selected resources in the first carrier for transmission at first time Ta and the list of candidate resources in the second carrier includes resources for transmission at first time Ta and third time Tc, then the UE 30 may select among the resources for transmission at first time Ta.
An example for modeling/implementation for this step is being described in the fourth embodiment.
The UE 30 selects resources for transmission in the second carrier.
The UE 30 performs the first transmission using the radio resources selected in the first carrier and the second transmission using the radio resources selected in the second carrier.

In this way transmissions on both carriers may happen at the same time, so that an amount of time the UE 30 is affected by half-duplex operation may be reduced.

In another example, the sensing-based resource allocation procedure described in the background section may be modified for transmission on two carriers in view of power considerations (extensions to more carriers are straightforward):
The UE 30 performs sensing individually on each of the carriers. For each carrier, the UE obtains independently a list of candidate radio resources for transmission.
(Optional) At least one of the lists of candidate resources is modified by discarding some of the resources.

For example, if the list of candidate resources for the first carrier contains resources for transmission at time first Ta and second time Tb and the list of candidate resources for the second carrier only contains resources for transmission at second time Tb, then the resources at second time Tb are removed from the list of the first carrier.

An example for modeling/implementation for this step is being described in the fourth embodiment.

Discarding some of the resources may be subject to some conditions. For example, if not enough resources can be found after discarding (e.g., 20%), then the UE 30 may stop (may not be allowed) to continue executing the method.

The UE 30 selects resources for a first transmission in a first carrier from the set of candidate resources. For example, resources may be selected at random.

The UE 30 restricts the list of candidate resources for the second carrier based on the resources selected for the first transmission in the first carrier.

For example, if the UE 30 has selected resources in the first carrier for transmission at first time Ta and the list of candidate resources in the second carrier includes resources for transmission at first time Ta and third time Tc, then the UE 30 may select among the resources for transmission at third time Tc.

An example for modeling/implementation for this step is being described in the fourth embodiment.

The UE 30 selects resources for transmission in the second carrier.

The UE 30 performs the first transmission using the radio resources selected in the first carrier and the second transmission using the radio resources selected in the second carrier In this way, transmissions on both carriers may happen at different points in time, so that the power need not to be shared between carriers. This latter method may be enabled, if the UE 30 exceeds the maximum power available for sidelink transmissions due to transmitting on more than one carrier at the same time.

Second Further Embodiment

Instead of completely discarding (optional Step 2 of the first embodiment) or restricting the list of candidate resources for selection (Step 3 of the first embodiment), the candidate resources may be ranked in according to priorities.

For example, the sensing-based resource allocation procedure described in the background section may be modified to allow for simultaneous transmission on two carriers (extensions to more carriers are straightforward):

The UE 30 performs sensing individually on each of the carriers. For each carrier, the UE 30 obtains independently a list of candidate radio resources for transmission.

(Optional) At least one of the lists of candidate resources may be modified by prioritizing the resources.

For example, if the list of candidate resources for the first carrier contains resources for transmission at first time Ta and second time Tb and the list of candidate resources for the second carrier only contains resources for transmission at second time Tb, then the resources at first time Ta are set to lower priority (e.g. to priority p1) compared to the other resources (e.g., having priority p2, where p1<p2) of the list of the first carrier.

An example for modeling/implementation for this step is being described in the fourth embodiment.

Setting the priority of the resources may be subject to certain conditions. For example, if not enough resources can be found based on information on resources from other carrier (e.g., 20%), then the UE 30 may not be allowed to set the highest possible priority. In other words, different priority levels can be defined based on the available resources.

The UE 30 selects resources for a first transmission in a first carrier from the set of candidate resources. For example, resources may be selected at random.

The UE 30 prioritizes the list of candidate resources for the second carrier based on the resources selected for the first transmission in the first carrier.

For example, if the UE 30 has selected resources in the first carrier for transmission at first time Ta and the list of candidate resources in the second carrier includes resources for transmission at first time Ta and third time Tc, then the UE 30 may select among the resources for transmission at first time Ta with higher priority (e.g. p2, where p2>p1).

An example for modeling/implementation for this step is being described in the fourth embodiment.

The UE 30 selects resources for transmission in the second carrier based on the priority levels.

The UE 30 performs the first transmission using the radio resources selected in the first carrier and the second transmission using the radio resources selected in the second carrier.

It is to be noted that similar procedure may be applied if resources are selected based on power limitation criteria.

Third Further Embodiment

This embodiment refers to an exemplary selection among different resource allocation procedures.

A UE 30 may be configured with a plurality of resource allocation procedures, e.g., as being described above and/or any further procedures.

A rule for selecting a resource allocation procedure out of the plurality of resource allocation procedures may depend on an occupancy situation in the different carriers. Occupancy of a carrier (or of a pool of resources in a carrier) may be determined by means of certain occupancy indicators, e.g. a channel busy ratio, CBR, or a channel ratio or occupancy ratio, CR.

If an occupancy indicator (e.g. CBR or CR) is below a certain threshold for a first carrier (e.g. carrier 1), the UE 30 may decide (may be allowed) to use a first resource allocation procedure on that carrier. Otherwise, it may decide (may be allowed) to use a second resource allocation procedure on that carrier.

For transmission on multiple carriers, the same resource allocation method must be allowed on all of them (e.g. on carrier 1 and carrier 2).

The same rule may be applied to multiple carriers (e.g. if the occupancy indicator for carrier 1 and carrier 2 is below a threshold, then a first resource allocation procedure is used. Otherwise a second procedure is used, or vice versa).

Alternatively or additionally, the rule for selecting a resource allocation procedure may depend on a priority of the message(s) to transmit. The Priority of the message may be determined by means of indicators like PPPP (ProSe Per Packet Priority).

As an example, if the message to transmit has a certain priority (e.g. PPPP above a certain threshold), then the UE 30 may (be allowed to) use a first resource allocation procedure on that carrier. Otherwise, it may (be allowed to) use a second resource allocation procedure.

Alternatively or additionally, the rule for selecting a resource allocation procedure may depend on a carrier or pool configuration.

As an example, if the aggregated carriers are configured for only safety applications, then the UE 30 may (be allowed to) use a first resource allocation procedure on that carrier. Otherwise, it may (be allowed to) use a second resource allocation procedure.

Fourth Further Embodiment

Embodiments disclosed above may be realized with different protocol stack modeling. In some examples described below, the UE 30 is configured to prioritize scheduling such that the transmissions on two or more carriers occur at the same time, so that the amount of time the UE 30 is affected by half-duplex constraints may be reduced. Similar measures can be taken mitigate power restriction constraints as discussed above.

In one option, the physical layer in the UE 30 passes (or signals) the candidate resources for the above-mentioned carriers to the MAC layer in the UE 30, (i.e. the MAC entity).

In order to mitigate the half-duplex constraints, the MAC entity checks for each TTI, at time a first time Ta, for which carriers the physical layer has indicated resource availability for transmission on that TTI. If the carrier (e.g. said the first carrier) which has selected resources available at the time Ta, also has resources available at a second time Tb, and
 1) such resources available at the second time Tb, as per physical layer signaling, are also available for said second carrier, and
 2) there is no other carrier for which physical layer indicated candidate resources at the first time Ta,
the MAC entity does not schedule resources for the first carrier for the TTI at the first time Ta. The MAC entity may instead deliver a sidelink grant at second time Tb to both a first sidelink HARQ entity (associated to the first sidelink carrier) and second sidelink HARQ entity (associated to the second sidelink carrier), and not provide to the first sidelink HARQ entity any sidelink grant at the second time Tb.

Each sidelink HARQ entity may use the resources selected by the MAC entity to accommodate data available in the sidelink buffer for the different sidelink processes allocated for this sidelink HARQ entity. Among the resources selected by the MAC entity to a sidelink HARQ entity, the sidelink HARQ entity may further select a subset of those resources (e.g. depending on the amount of data available in the buffer) or simply use all those resources and tune the transmitting parameters (e.g. MCS) to accommodate the data available.

Each sidelink HARQ entity may deliver then their respective data to physical layer for data transmissions.

In another embodiment, the physical layer or PHY in the UE 30 passes the candidate resources for the two above said carriers to the MAC layer (or the MAC entity) in the UE 30. The MAC entity allocates resources to both sidelink carriers and associated sidelink HARQ entities on the base of the said passed candidate resources without any further action as compared to option described above.

The HARQ entities may deliver their respective data to physical layer which may mute or suppress some of the transmissions which the MAC layer may have granted, e.g. muting or suppressing of transmissions on resources at first time Ta (to take care that the data associated to the corresponding HARQ entity for transmission at first time Ta are not transmitted).

In an embodiment, the physical layer removes resources at the first time Ta from the set of candidate resources to be passed to MAC layer (in this case, the MAC layer may only perform resource allocation of the resources available at first time Ta signaled by PHY).

In an embodiment, the UE 30 (MAC layer or PHY layer) may further consider other factors to determine whether to select resources at first time Ta or second time Tb. For example, even if for both first carrier and second carrier, there are candidate resources at second time Tb and only for one of said carriers, e.g. the first carrier, there are candidate resources available at first time Ta, the MAC entity may eventually schedule transmission for first sidelink HARQ entity (of first carrier) at first time Ta and/or second time Tb, and transmissions for second sidelink HARQ entity (of second carrier) at time Tb. Thereto, at least one of the following conditions may be met:
 1) the time gap between the TTI at first time Ta and the TTI at second time Tb is larger than a certain threshold,
 2) delay sensitive data is present in the sidelink HARQ buffer, for which transmitting at second time Tb may not fulfill latency requirements,
 3) an amount of data in the buffer is larger than the resources available by only transmitting at second time Tb, e.g. it would result in more RLC SDUs segments than transmitting on both first time Ta and second time Tb,
 4) by transmitting on both carriers at first time Ta, the UE 30 available power budget is exceeded.

One or more of the above-described factors may be considered by the UE 30. Which factors should be considered may depend on UE implementation, network configuration, and/or preconfigured in the UE 30. For example, the (pre)configuration may enable the UE 30 to follow the above methods following one or more of the above factors, or depend on the actual UE status (e.g., UE power available, battery power remained) and sidelink UE buffer status.

Fifth Further Embodiment

According to some embodiments, the selection of a first set of available resources for transmission on a carrier (e.g. on a first carrier) is either according to pre-configuration or based on some rules considering parameters such as load on the carriers (e.g., measured by CBR) and/or service-to-carrier mapping, etc. For instance, in above embodiments, the carrier with the least CBR is selected as the first carrier among all the available carriers. Similarly, in above embodiments, the carrier with mapping to high-priority applications are selected as the first carrier.

In an embodiment, if more than two carriers are available, the carriers may be ranked to apply resource (re)selection restrictions according to the above embodiments.

With reference to FIG. 5, in accordance with embodiments, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points, each defining a corresponding coverage area 3213a, 3213b, 3213c. Each base station or eNB, here being referred to as eNBs 3212a, 3212b, 3212c is connectable to the core network 3214 over a wired or wireless connection 3215. A first user equipment (UE), here being referred to as (first) UE 3291 located in coverage area 3213*c* is configured to wirelessly connect to, or be paged by, the corresponding base station 3212*c*. A second UE 3292 in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 5 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to connected (first) UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 6. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a (further) UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a (further) base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 6) served by the base station 3320. The communication interface 3326 may be configured to facilitate a connection 3360 to the host computer 3310. The connection 3360 may be direct or it may pass through a core network (not shown in FIG. 6) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

It is noted that the host computer 3310, base station 3320 and UE 3330 illustrated in FIG. 6 may be identical to the host computer 3230, one of the base stations 3212*a*, 3212*b*, 3212*c* and one of the UEs 3291, 3292 of FIG. 5, respectively. This is to say, the inner workings of these entities may be as shown in FIG. 6 and independently, the surrounding network topology may be that of FIG. 5.

In FIG. 6, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure.

One or more of the various embodiments improve the performance of OTT services provided to the UE 3330 using the OTT connection 3350, in which the wireless connection 3370 forms the last segment. More precisely, the teachings of these embodiments may improve the latency or power consumption and thereby provide benefits such as better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figures 7, 8:
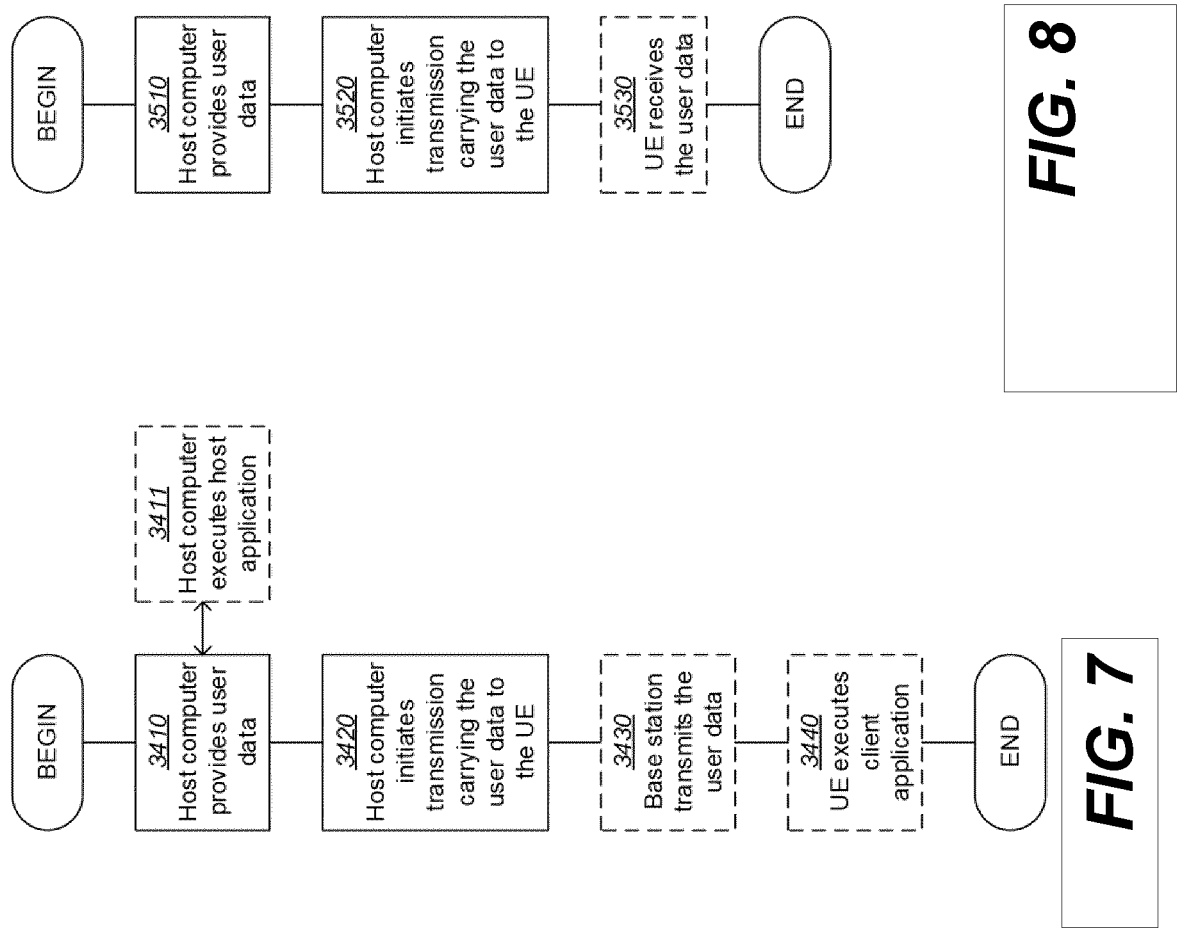

FIG. 7 is a flowchart illustrating a method implemented in a communication system, in accordance with one embodiment. The communication system includes a host computer, a base station and a UE which may be those described with reference to FIG. 5 and FIG. 6. For simplicity of the present disclosure, only drawing references to FIG. 7 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 8 is a flowchart illustrating a method implemented in a communication system, in accordance with one embodiment. The communication system includes a host computer, a base station and a UE which may be those described with reference to FIG. 5 and FIG. 6. For simplicity of the present disclosure, only drawing references to FIG. 8 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figure 9:
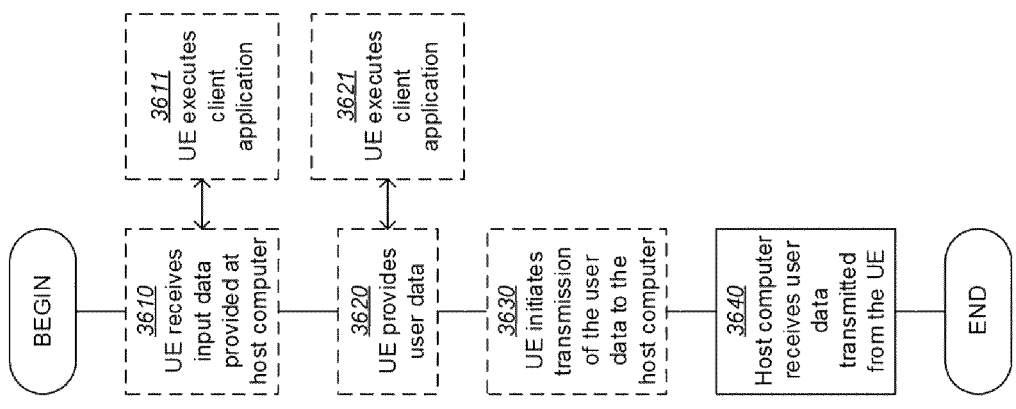

FIG. 9 is a flowchart illustrating a method implemented in a communication system, in accordance with one embodiment. The communication system includes a host computer, a base station and a UE which may be those described with reference to FIG. 5 and FIG. 6. For simplicity of the present disclosure, only drawing references to FIG. 9 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

Figure 10:
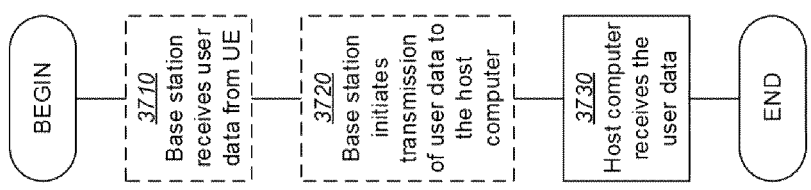

FIG. 10 is a flowchart illustrating a method implemented in a communication system, in accordance with one embodiment. The communication system includes a host computer, a base station and a UE which may be those described with reference to FIG. 5 and FIG. 6. For simplicity of the present disclosure, only drawing references to FIG. 10 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

The invention claimed is:

1. A method in a radio device of radio resource allocation for transmitting data on a plurality of communication carriers, the method comprising:
   sensing on a first carrier and obtaining a first set of candidate radio resources for a first transmission on the first carrier;
   performing a first selection of one or a plurality of the candidate radio resources from the first set to be used for the first transmission on the first carrier;
   sensing on a second carrier different from the first carrier and obtaining a second set of candidate radio resources for a second transmission on the second carrier on the second carrier;

performing a second selection of one or a plurality of the candidate radio resources from the second set to be used for the second transmission; and wherein the first selection and the second selection are performed in time dependency to each other.

2. The method of claim 1, wherein the second selection is performed in time dependency of the first selection.

3. The method of claim 1, wherein the radio resources are characterized according to one or a plurality of resource properties, and wherein the second selection is performed based on an evaluation of resource properties: of the one or the plurality of the candidate radio resources selected from the first set, and of the radio resources of the second set.

4. The method of claim 3, wherein one of the resource properties is a transmission time, e.g. a transmission time interval, TTI.

5. The method of claim 1, wherein the first set of candidate radio resources is performed by selecting a certain number of radio resources among the candidate radio resources obtained by the sensing on the first carrier.

6. The method of claim 1, wherein the first set of candidate radio resources is performed by randomly selecting a certain number of radio resources among the candidate radio resources obtained by the sensing on the first carrier.

7. The method of claim 1, wherein the first selection is performed in dependency of the second set of candidate radio resources obtained by the sensing on the second carrier.

8. The method of claim 7, wherein a first subset of candidate resources is obtained by removing one or a plurality of candidate radio resources from the first set in dependency of the second subset, and wherein performing the first selection is performed by selecting the one or the plurality of the candidate radio resources from the first subset.

9. The method of claim 8, wherein if the list of candidate resources for the first carrier comprises resources for transmission at a first time (TTI1) and a second time (TTI2) and the list of candidate resources for the second carrier only contains resources for transmission at the first time (TTI1), the resources at the second time (TTI2) are removed from the first set.

10. The method of claim 1, wherein performing the second selection comprises selecting a radio resource associated to the same transmission time (TTI1) as the transmission time associated to at least one of the resources selected to be used for the first transmission.

11. The method of claim 10, wherein if the radio resources selected from the first set are resources for a first transmission time (TTI1) and the list of candidate resources in the second carrier comprises radio resources for transmission at the first transmission time (TTI1) and at a second transmission time (TTI2), the second selection comprises discarding the radio resources at the second transmission time.

12. The method of claim 1, wherein performing the second selection comprises not selecting radio resources from the second set that are not associated to any transmission time of any the radio resources selected to be used for the first transmission.

13. The method of claim 1, wherein performing the second selection comprises selecting out of the second set one or a plurality radio resources for one or a plurality of transmission times that is/are different to the one or the plurality of transmission times of the radio resources selected to be used for the first transmission.

14. The method of claim 13, wherein if the radio resources selected from the first set are resources for a first transmission time (TTI1) and the list of candidate resources in the second set comprises radio resources for transmission at the first transmission time (TTI1) and at a transmission second time (TTI2), the second selection comprises selecting among the radio resources at the second transmission time or discarding the radio resources at the first transmission time.

15. The method of claim 1, further comprising ranking the set of candidate radio resources for the second transmission into a plurality of priority levels in dependency of the one or the plurality of the candidate radio resources of the first selection.

16. The method of claim 15, wherein the ranking is performed based on a comparison of the transmission times of the candidate resources selected from the first set for the first transmission, and the transmission times of the candidate resources of the candidate resources of the second list.

17. The method of claim 16, wherein the ranking is performed such that radio resources for transmission at the same time as the transmission time of any of the resources selected from the first set for the first transmission are ranked higher than the other resources of the second set.

18. The method of claim 17, wherein performing the second selection of the one or the plurality of the candidate radio resources from the second set to be used for the second transmission is based on the priority levels of the radio resources, such that only radio resources of the priority level above the lower level are selected, or that only radio resources of the priority level above the lower level are selected, if the number of such radio resources is not smaller than a certain or defined number.

19. The method of claim 16, wherein the ranking is performed such that radio resources for transmission at the same time as the transmission time of any of the resources selected from the first set for the first transmission are ranked lower level than a priority level of the other resources of the second set.

20. The method of claim 1, wherein the radio device comprises physical layer functions and MAC layer functions, wherein the steps of sensing on the first carrier and sensing on the second carrier are performed by the physical layer functions, and wherein the physical layer functions transmit an information indicative of the candidate radio resources of the first set and the second set to the MAC layer functions.

21. The method of claim 20, wherein the MAC layer functions perform the first selection and the second selection.

22. The method of claim 21, wherein the wireless device further comprises a first HARQ function associated to the first carrier and a second HARQ function associated to the second carrier and wherein the MAC layer performs resource grants to said HARQ functions according to the first and second selections.

23. A communication system including a host computer, the communication system comprising:
processing circuitry configured to provide user data;
a communication interface configured to forward the user data to a cellular network for transmission to a user equipment (UE); and
wherein the cellular network comprises a base station having a radio interface and processing circuitry, the base station's processing circuitry configured to perform:
sensing on a first carrier and obtaining a first set of candidate radio resources for a first transmission on the first carrier;

performing a first selection of one or a plurality of the candidate radio resources from the first set to be used for the first transmission on the first carrier;

sensing on a second carrier different from the first carrier and obtaining a second set of candidate radio resources for a second transmission on the second carrier;

performing a second selection of one or a plurality of the candidate radio resources from the second set to be used for the second transmission on the second carrier; and wherein the first selection and the second selection are performed in time dependency to each other.

24. The communication system of claim 23, further including the base station.

25. The communication system of claim 24, further including the UE, wherein the UE is configured to communicate with the base station.

26. The communication system of claim 25, wherein:
the processing circuitry of the host computer is configured to execute a host application, thereby providing the user data; and
the UE comprises processing circuitry configured to execute a client application associated with the host application.

27. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs;
sensing on a first carrier and obtaining a first set of candidate radio resources for a first transmission on the first carrier;
performing a first selection of one or a plurality of the candidate radio resources from the first set to be used for the first transmission on the first carrier;
sensing on a second carrier different from the first carrier and obtaining a second set of candidate radio resources for a second transmission on the second carrier;
performing a second selection of one or a plurality of the candidate radio resources from the second set to be used for the second transmission on the second carrier; and
wherein the first selection and the second selection are performed in time dependency to each other.

28. The method of claim 27, further comprising: at the base station, transmitting the user data.

29. The method of claim 28, wherein the user data is provided at the host computer by executing a host application, the method further comprising: at the UE, executing a client application associated with the host application.

30. A communication system including a host computer, the communication system comprising:
processing circuitry configured to provide user data;
a communication interface configured to forward user data to a cellular network for transmission to a user equipment (UE); and
wherein the UE comprises a radio interface and processing circuitry, the UE's processing circuitry configured to perform:
sensing on a first carrier and obtaining a first set of candidate radio resources for a first transmission on the first carrier;
performing a first selection of one or a plurality of the candidate radio resources from the first set to be used for the first transmission on the first carrier;
sensing on a second carrier different from the first carrier and obtaining a second set of candidate radio resources for a second transmission on the second carrier;
performing a second selection of one or a plurality of the candidate radio resources from the second set to be used for the second transmission on the second carrier; and
wherein the first selection and the second selection are performed in time dependency to each other.

31. The communication system of claim 30, further including the UE.

32. The communication system of claim 31, wherein the cellular network further includes a base station configured to communicate with the UE.

33. The communication system of claim 31, wherein:
the processing circuitry of the host computer is configured to execute a host application, thereby providing the user data; and
the UE's processing circuitry is configured to execute a client application associated with the host application.

* * * * *

UNITED STATES PATENT AND TRADEMARK OFFICE
CERTIFICATE OF CORRECTION

PATENT NO. : 11,399,368 B2
APPLICATION NO. : 16/767495
DATED : July 26, 2022
INVENTOR(S) : Blasco Serrano et al.

Page 1 of 1

It is certified that error appears in the above-identified patent and that said Letters Patent is hereby corrected as shown below:

In the Specification

In Column 6, Line 25, delete "plurality" and insert -- plurality of --, therefor.

In Column 6, Line 33, delete "first the time" and insert -- first time --, therefor.

In Column 6, Lines 46-47, delete "of the candidate resources of the candidate resources" and insert -- of the candidate resources --, therefor.

In Column 7, Line 31, delete "MAC entity 31" and insert -- MAC entity 32 --, therefor.

In Column 7, Line 45, delete "second time (TTI1)" and insert -- second time (TTI2) --, therefor.

In Column 16, Line 33, delete "substep 3630," and insert -- step 3630, --, therefor.

In the Claims

In Column 16, Lines 66-67, in Claim 1, delete "on the second carrier on the second carrier;" and insert -- on the second carrier; --, therefor.

In Column 17, Line 58, in Claim 12, delete "any the" and insert -- any of the --, therefor.

In Column 17, Line 62, in Claim 13, delete "plurality" and insert -- plurality of --, therefor.

In Column 18, Lines 16-17, in Claim 16, delete "of the candidate resources of the candidate resources" and insert -- of the candidate resources --, therefor.

In Column 19, Line 32, in Claim 27, delete "performs;" and insert -- performs: --, therefor.

Signed and Sealed this
Fourth Day of April, 2023

Katherine Kelly Vidal
*Director of the United States Patent and Trademark Office*